Jan. 4, 1966   H. W. MOSER ETAL   3,226,840
DOUBLE FACER PAPERBOARD AIR LIFT METHOD AND APPARATUS
Filed March 26, 1962   4 Sheets-Sheet 4

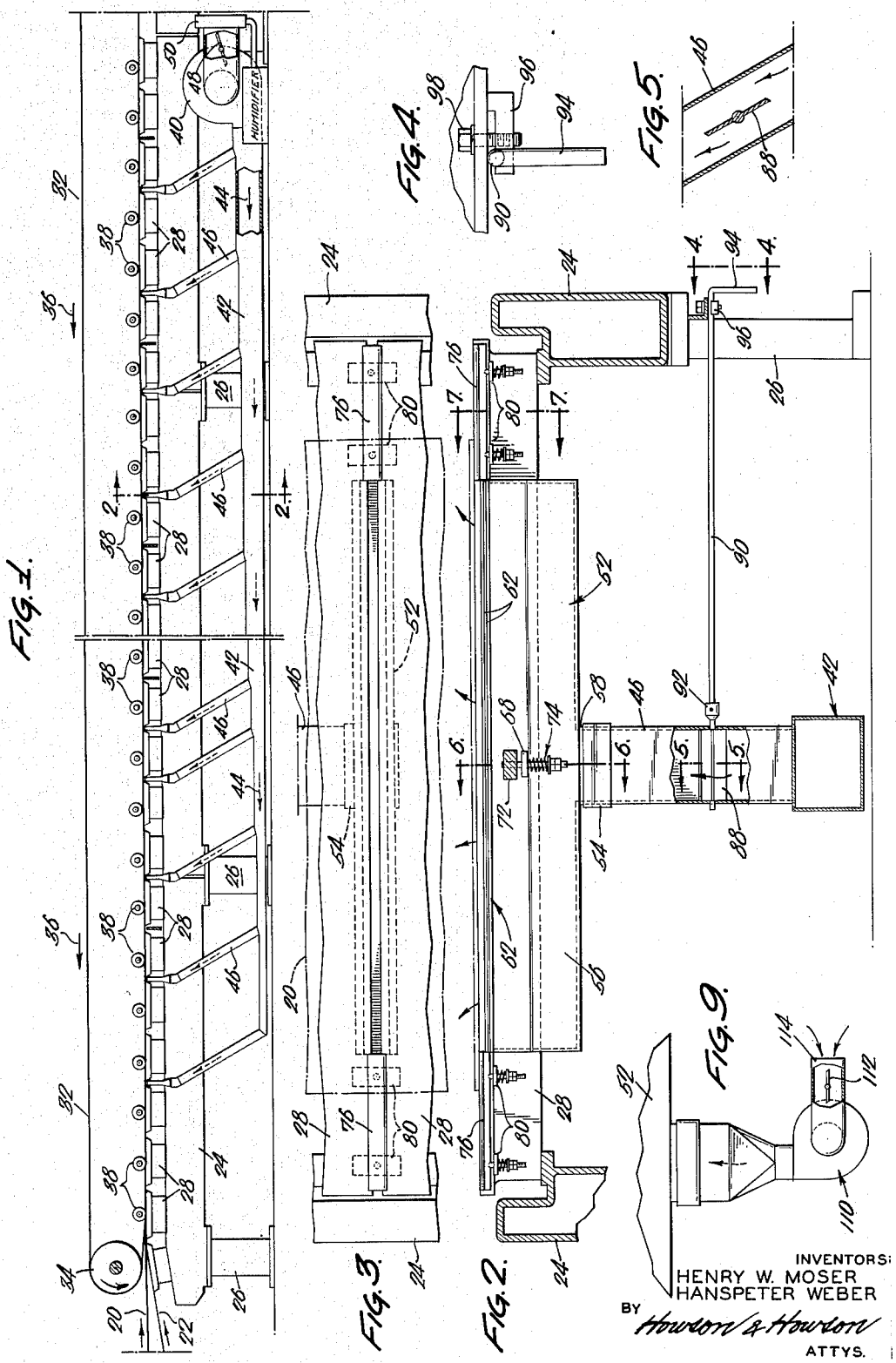

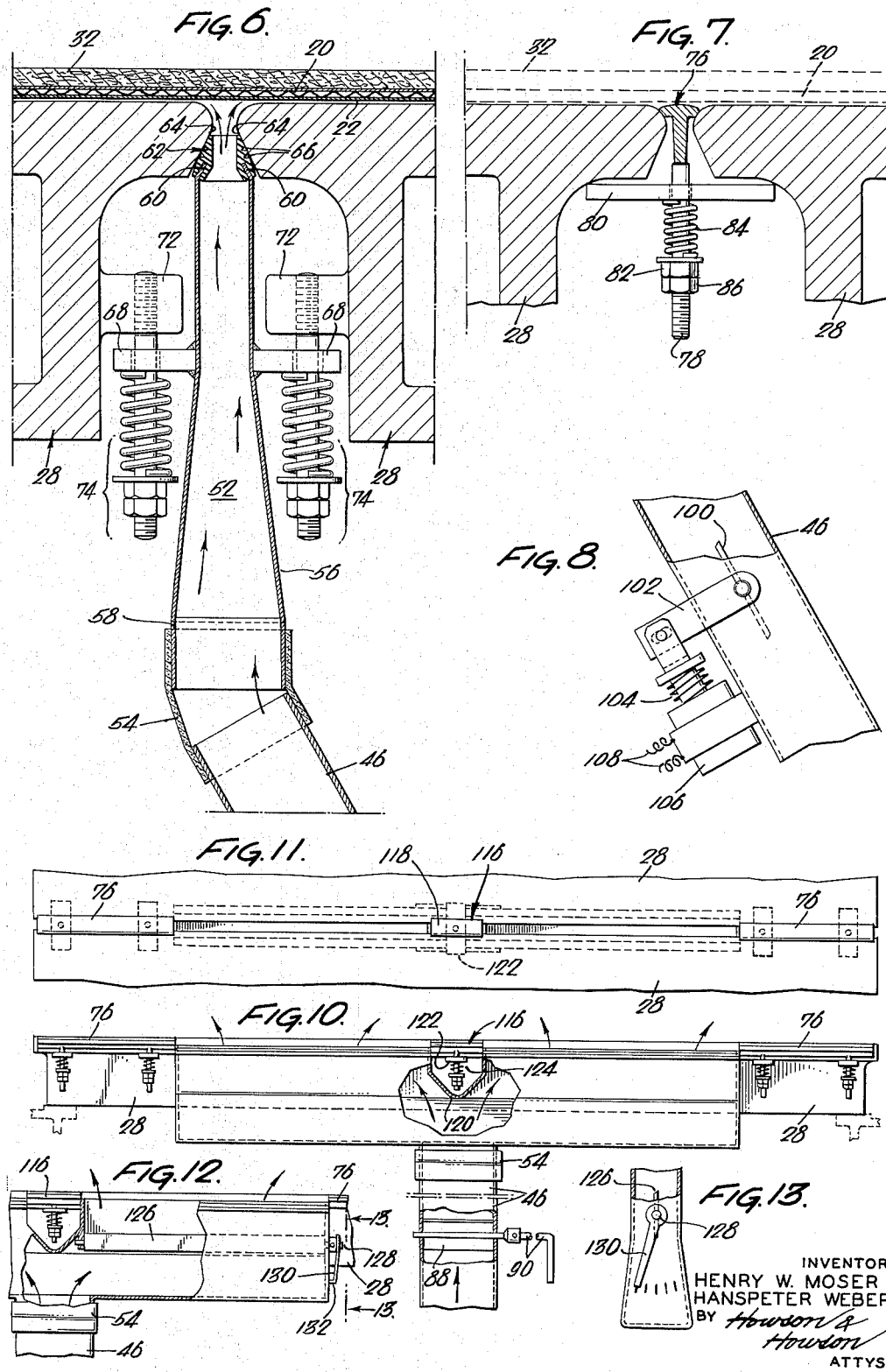

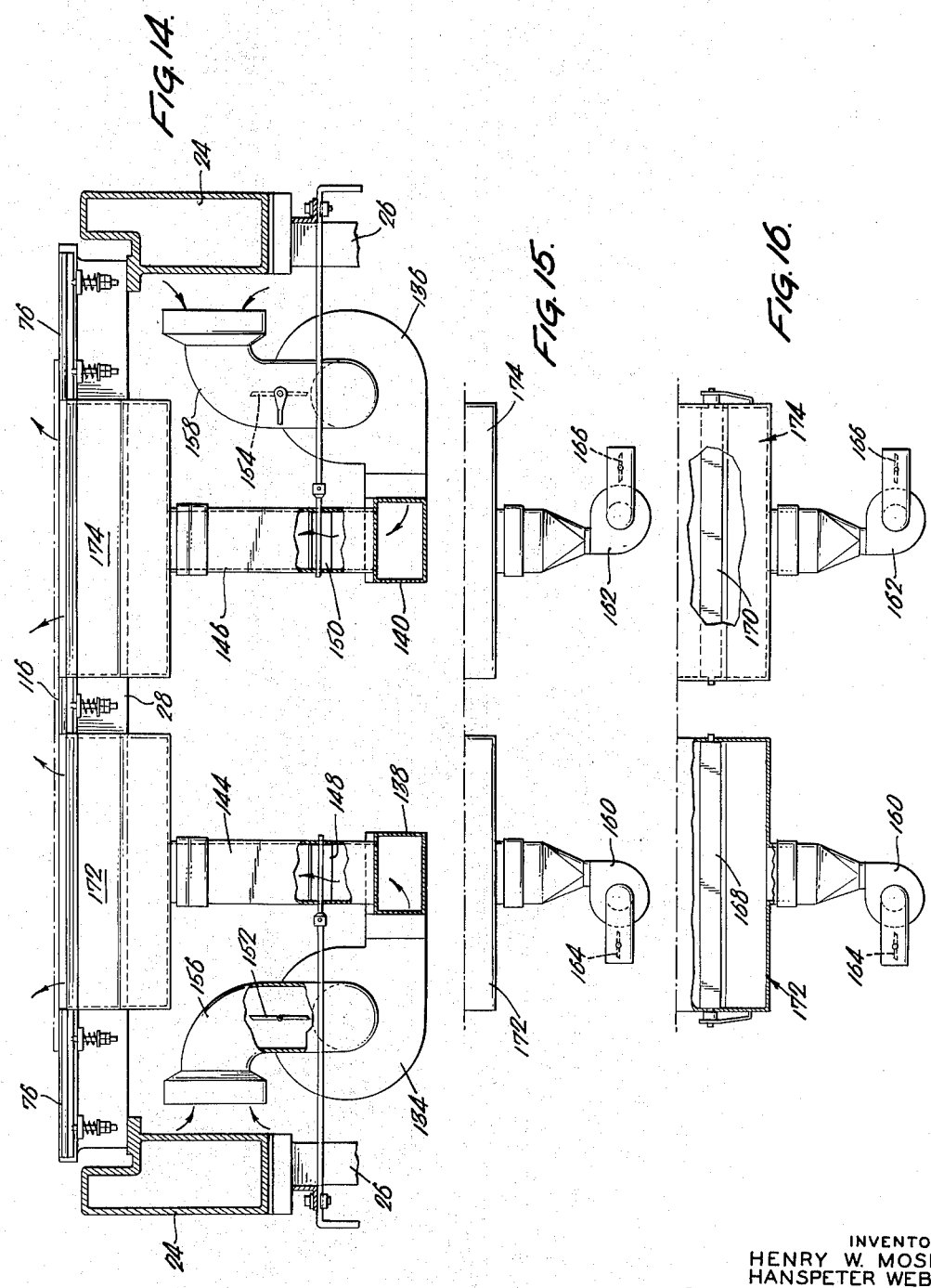

INVENTORS:
HENRY W. MOSER
HANSPETER WEBER
BY
Howson & Howson
ATTYS.

3,226,840
DOUBLE FACER PAPERBOARD AIR LIFT METHOD AND APPARATUS
Henry W. Moser and Hanspeter Weber, Haddonfield, N.J., assignors to Samuel M. Langston Company, Camden, N.J., a corporation of New Jersey
Filed Mar. 26, 1962, Ser. No. 182,499
9 Claims. (Cl. 34—41)

The present invention relates generally to the manufacture of corrugated paperboard and more specifically to an improoed method of and an improved apparatus for regulating and controlling the temperature of double faced corrugated paperboard as it passes through a double facer machine for curing the adhesive and prevent damage to the board.

Corrugated board is manufactured at a high production rate on corrugating machines which are well known in the paperboard industry. Generally speaking, a typical machine for this purpose includes a corrugating and gluing section, a heating or facing section, and a cooling section. During passage through the first section, corrugations are formed transversely across an intermediate sheet, then liquid adhesive is applied, usually to the tops of the flutes or ridges of the corrugated sheet. After the adhesive is applied, a liner sheet is brought into contact with the glue-coated flutes, then the assembled sheet, now consisting of one liner and a corrugated board, is advanced past the glue machine and thereafter an outer liner is applied to the opposite side of the corrugated sheet. The combined board consisting of the three sheets secured by adhesive then passes over a heating section where the liquid adhesive is set or hardened by the application of heat.

When advancing through the heating section of the machine, the freshly glued board is in sliding contact with a serise of hot platens or plates which are generally heated by steam pressure to a temperature range necessary to set the glue. In normal practice the board when moving over the hot platens or plates, is held down by a ballast belt which rests upon the upper liner sheet and advances together with the board at the same speed. As the heat acts upon the adhesive, it also drives off the moisture from the combined corrugated and liner sheets thereby causing the finished board to issue from the downstream end of the heating section in stiff, flat condition. Subsequently, the so treated board passes through a cooling section to reduce its temperature so that it can be handled for further operations or treatment.

Difficulties have been experienced heretofore in the heating section if too much heat is applied to a given sheet material since the paper fibers may thereby be damaged causing the board to issue from the heating section in brittle condition and too great an application of heat also may cause the board to shrink transversely or longitudinally or some instances, to warp or curl. It is of course desirable to maintain the highest speed possible of the board passing through the machine for high production rates.

In addition to the aforementioned difficulties, there is an increasing problem due to high speed operations in modern double facer equipment since under normal high speed operations, a great quantity of heat is necessary and if for any reason the speed is decreased or the apparatus is stopped, this high heat will in a very short period of time cause damage to the corrugated board being manufactured. Due to this high speed operation, a considerable amount of waste material can result if these high heat conditions exist.

Heretofore attempts have been made to obviate these problems. It has been found that controlling the temperature of hot plates used, by regulating for example the steam supply, is not feasible due to the mass of the hot plate and the only control, therefore, would be by regulating the speed of the entire machine. This is not feasible under some conditions.

One type of mechanism and a method for regulating rapidly temperature in the heating section, was to modify the conventional heating section in such a manner that the heated platens may be shifted toward or away from the advancing corrugated board in accordance with the requirements of the material without substantially changing the speed of the corrugating machine. Such a device is shown, for example, in Patent No. 2,941,573, dated June 21, 1960.

Patent 2,987,105, dated June 6, 1961, discloses a further attempt to overcome this heat problem by utilizing mechanism for increasing the moisture content of the partially dried corrugated board by the use of spray nozzles between the steam chests to prevent overheating.

It is a primary object of the present invention to provide a method and means for regulating and controlling the temperature of the double faced corrugated paperboard as it passes through a double facer machine to prevent damage to the paperboard regardless of the speed at which the board travels through the machine and in an improved manner overcoming all drawbacks and deficiencies of prior known methods and apparatus.

It is a further object of the present invention to provide a method for and apparatus to prevent overheating and/or scorching of double faced paperboard in a double facer machine when the board must remain in the machine when it is stopped for some reason or when the double facer is slowed down or operated below normal operating speed for some reason.

An additional object of the present invention is to provide method and apparatus which will give better control of the temperature of the board while it is travelling through the double facer at normal operating speed and to permit control of the temperature in selected areas to prevent warpage of the board.

A still further object of the present invention is to provide a method and apparatus permitting more closely regulating and controlling temperature of double faced board when the board is lined with paper which is thinner than is normally used or which is more sensitive to temperature variation or overheating.

In accomplishing these objects, the present invention teaches a method of and means for injecting a variable and controllable air film between the steam chests or hot plates of a double facer and the lower surface of the double faced corrugated paperboard in selected areas, so that the heat from the steam chests imparted to the board will be kept approximately constant at the desired temperature when the board is travelling at normal operating speed, when it is travelling at a speed slower then operating speed and when the board is brought to a stop. The arrangement will prevent the board from being overheated or scorched and will also reduce or eliminate warpage during the curing and drying of the board.

The method of accomplishing the desired objects and features is enhanced by providing means of injecting this film of air of variable thickness and this air film operates to lift the board the amount required to reduce the heat transferred to the board from the surface of the steam chests resulting in the possibility to regulate and control the temperature of the board so that it will be approximately constant regardless of the speed of the double facer and the board travelling through it. This air film can be injected between each and every pair of steam chests so that it can be injected between a single pair, any multiple of pairs or all pairs at one time. Means can also be incorporated whereby one-half of the space between each and every pair of steam chests can be provided with the air lift so that the board can be separated from any, all or one-half of any and all chests so that the separation can take place in any selected area. The possibility to create this air film in selectable areas and of varying amounts between the board and steam chests or hot plates permits a high degree of regulating and maintaining the desired temperature for various areas of the board.

Additional objects and advantages of the present invention will be more readily apparent from the following detailed description of embodiments thereof when taken together with the accompanying drawings in which:

FIG. 1 is a diagrammatic side view of the drying section of a corrugating machine embodying the principles of the invention;

FIG. 2 is a sectional elevational view on line 2—2 of FIG. 1;

FIG. 3 is a fragmentary plan view of the apparatus taken at a position showing the spacing between adjacent steam chests;

FIG. 4 is a view taken on line 4—4 of FIG. 2 of damper adjusting means;

FIG. 5 is a sectional view taken on line 5—5 of FIG. 2 showing damper means;

FIG. 6 is an enlarged sectional view taken on line 6—6 of FIG. 2;

FIG. 7 is an enlarged fragmentary sectional view taken one line 7—7 of FIG. 2;

FIG. 8 is a fragmentary view of solenoid damper actuating means;

FIG. 9 is a fragmentary elevational view of a modification utilizing a single blower for air exhaust tube and control therefore;

FIG. 10 is a view similar to FIG. 2 of a modified form including a central stationary air stop covering the outlet of the exhaust tube;

FIG. 11 is a plan view of the modification of FIG. 10;

FIG. 12 is a fragmentary view of a further modification similar to FIG. 10 but incorporating separate dampers for each half of the exhaust tube;

FIG. 13 is a fragmentary view taken on line 13—13 of FIG. 12 showing the damper control means thereof;

FIG. 14 is an elevational view of another modification utilizing two half portion exhaust tubes and separate primary blowers for each half of the machine;

FIG. 15 is a fragmentary elevational view of an additional modification wherein each separate half exhaust tube is provided with its individual blower and control means therefor;

FIG. 16 is a view of a still further modification similar to that of FIG. 15 but wherein dampers are provided in the supply duct;

Figure 17:
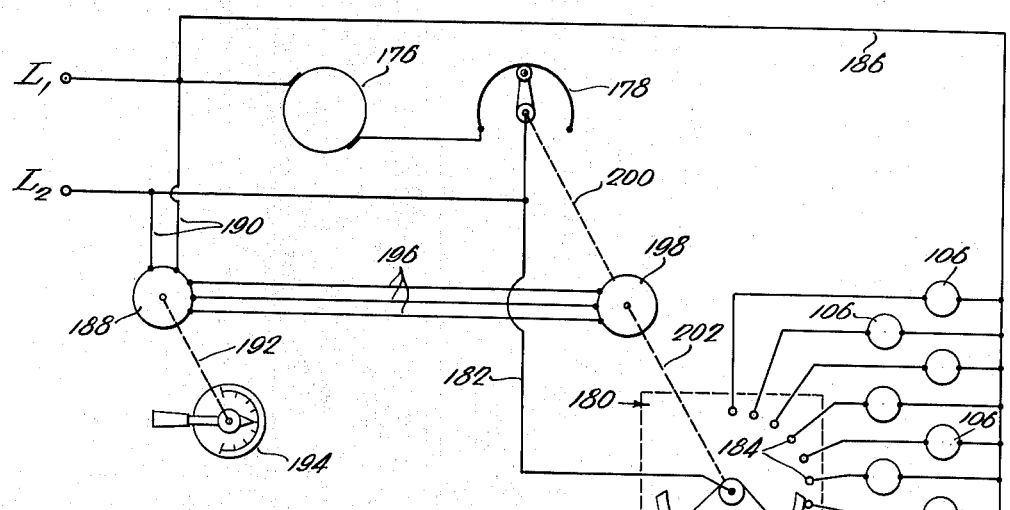
FIG. 17 is a schematic view of electrical control means for the apparatus.

Referring now in detail to the drawings, the only portion shown in detail which normally would comprise a conventional corrugating machine is the heating section. As shown in FIG. 1, a web 20 consisting of the corrugated medium and a liner having adhesive therebetween and coming from the single facer. The other liner 22 and the web 20 are shown as being fed into the heating section from the left in the direction of the arrows. In general the heating and drying section shown in FIG. 1 includes longitudinally disposed side frames 24—24 as in a typical double facer machine such as that shown and described in Patent No. 2,993,527, dated July 25, 1961, and assigned to a common assignee with the present application. As usual, these side frames 24 are supported by posts such as at 26 and mount a plurality of conventional type steam chests 28 which rest on and are supported by the frames 24. It will be seen that these are in spaced relationship with respect to their tops and are adapted to support the composite corrugated paperboard consisting of the single face web 20 and linear 22 with adhesive therebetween in sliding contact over the platens or steam chests. As the freshly glued corrugated composite web advances through the drying section, resting in sliding contact on the hot plates or platens on the steam chest and which platens are indicated at 30 (FIG. 6) is held in contact by a ballast belt 32 having its forward end passing over a roller 34 and travelling in the direction of arrows 36. A series of ballast rollers 38 suitably journaled by means not shown rest upon the lower run of the ballast belt to hold the belt under regulated pressure upon the corrugated board. The finished board issues from the downstream end of the heating section in stiff flat condition and passes to the cooling section, not shown, and is thence taken for further operations.

The heating section so far described, consisting essentially of the heated platens and ballast belt structure, is conventional and the length of the heating section and the temperature of the platens is sufficient to completely dry the freshly glued corrugated board as it advances along the platens at a desired speed. As pointed out hereinbefore, the prior art teaches control of the temperature by means of accelerating or decelerating speed of the overall machine and therefore the web passed therethrough and additionally, by means of raising and lowering of platens and/or the use of moisture spray against the underside of the travelling corrugated web.

In order to accomplish the temperature control of the present invention as broadly described hereinbefore, low pressure air in high volumes is used, and not compressed or high pressure air, for lifting the board for efficiency and also for the sake of economy.

The drawings show certain selected embodiments or modifications for supplying this forced air between the platens to act against the underside of the travelling composite web to lift it off of the platens for temperature control and it is to be understood that the modifications shown are for the purpose of illustration only and the invention is not to be construed as limited specifically thereto.

In the embodiment of FIG. 1, the forced air is supplied by a centrifugal fan or blower 40 and the forced air travels through a header duct 42 in the direction indicated by arrows 44. It will be noted that the cross section of header duct 42 is reduced following each take-off air tube 46 so that the pressure at all exhaust nozzles will be approximately the same when all dampers are fully open. An air inlet control damper 48 is provided in the air intake 50 to blower 40 for overall air flow control.

Each take-off air tube 46 has the same cross sectional area, the total area of all of which is approximately equal to the area of the duct connected to the exhaust of the blower 40. The end of each air tube 46 is connected to an exhaust tube generally designated 52 (FIG. 6) by means of a flexible textile fabric or the like such as cotton duct or an equivalent material in the nature of a sleeve indicated at 54. It will be seen that each exhaust tube 52 has a tapering lower main body portion 56 which tapers into a smaller upper neck section 58 terminating at its upper ends in inturned end lips 60. The end of each exhaust tube 52 is provided with a flexible air nozzle 62 which is composed of a flexible heat resisting material such as silicone rubber. This material is adapted to act as an air seal against the rough cast surface 64 of adjoining steam chests into which the air nozzle 62 extends. The material and arrangement compensate for expansion and contraction due to heating and cooling of the chests. The nozzle material in the embodiment shown in FIG. 6 is molded in strips and has a cross section which tapers from bottom to top with the exterior being provided with transversely extending grooves 66 to provide for sharply defined edges for better sealing contact with the material of the steam chest. In order to support the exhaust tubes, any desired means can be utilized such as for example only, plates 68 secured to the neck portion 58 by welding or the like below lugs 72 formed on the steam chests and bolts and springs 74 which serve to resiliently lock the tube in position. The nozzle material strips permit them to be easily assembled on the end of the tube on the erection floor or in the users plant as will be readily apparent.

The nozzles 62 and the exhaust tubes 52 in the embodiment of FIGS. 1–3 inclusive extend transversely across and between the area between adjoining steam chests. In order to eliminate the waste of air when narrow width board is being produced, the air exhausts 52 and nozzles 62 are only as wide as the narrowest board that is likely to be produced on this machine. The remainder of the space between the steam chests is closed by an air baffle or shutter 76 which rests on the curved outer edges of the steam chests and has a generally curved top face to prevent interference with board passing thereover. This shutter carries a threaded shank 78 which passes through a plate 80 and is maintained in place by means of nuts 82 and spring 84 interposed therebetween and plate 80. This arrangement permits movement of the shutter upon expansion or contraction of the steam chests as will be apparent. This arrangement also compensates for the rough cast surface of the chests. Also as seen in FIG. 7, a lock nut 86 is provided. The nut 82 and lock nut 86 permit assembly of the shutter between the steam chests, adjusting it sideways against the nozzle 62 and securing it in place. It is to be understood that while the nozzles 62 are only as wide as the narrowest board that will be produced on the machine, this permits however, adequate air lift for all widths of board up to and including the widest board that can be produced on the machine.

As set forth hereinbefore, it is desirable to be able to regulate the flow of air through the nozzles. This can be accomplished in the embodiments of FIGS. 1–3, for examle, by means of a damper 88 secured on damper rod 90 which carries a positioning collar 92. The outer end of rod 90 is bent to form a handle 94 which is supported by means of bracket 96 secured on post 26 by bolt 98 as shown in detail in FIG. 4. The arrangement is such that upon tightening of bolt 98 the rod 90 will be frictionally locked in place by the bracket 96. A damper such as described, is provided in each air tube 52 to permit regulating a flow of air through each nozzle 62 by hand.

It is believed that operation of this embodiment of the invention will be readily apparent from the foregoing discussion but briefly if at any time it is desired to decrease the heat transfer between any given steam chest or platen and the corrugated board passing thereover such as when the machine is slowed down then the air blower is placed into operation as will be described in detail hereinafter and by regulating any of the various dampers, a film or low pressure air will be interposed between the platens and the corrugated board and of high volume to lift the corrugated board away from contact with the platen and this serves as an insulating film which decreases heat transfer to the corrugated board. Under varying conditions, of course, the volume of air or pressure of air at the air lift nozzles 64 will differ but at the present time a desired range is between 50 c.f.m. and 400 c.f.m. of air delivered to each nozzle 64 and preferably approximately 200 c.f.m. at between ½ inch and 84 inches static pressure (water column). The present invention is not to be confined to this specific arrangement, however, since others can be utilized as will be readily apparent.

Instead of a manual control of damper operation, electrical or fluid control can be effected. As an example, FIGURE 8 shows a solenoid operation as applied to a damper. Here the damper 100 is carried by an arm 102 which is suitably pivotally mounted and the outer end of the arm is operatively connected to a plunger 104 of a solenoid generally indicated at 106 operable in a usual manner through electrical connections indicated 108. This arrangement permits controlling the air from the nozzle for injecting an air film between the board and steam chests by hand push button operation by remote central control and the dampers can be operated through the solenoid which in turn can control fluid cylinders or electric solenoids.

A modification which can be utilized to practice the invention is shown in FIG. 9 wherein each exhaust tube 52 is provided with an individual blower 110 which is individually and separately controllable, if desired, and a damper 112 can be provided in the intake tube 114 of each such blower 110.

FIGS. 10 and 11 disclose a further modification of the invention and are similar in construction to the apparatus of FIGS. 2 and 3 respectively but include additionally, a stationary air stop generally designated 116 consisting of a plate or shutter member 118 mounted on stud 120 which extends through plate 122 and carries a spring 124 and nut and lock nut 126. This arrangement is such that the plate or shutter 118 can move upon expansion or contraction of the steam chests and as will be seen from FIG. 11 the stationary air stop closes the gap between adjoining platens and it has been found that the provision of this center air stop effectively prevents the board from bowing up in the center to such an extent that the adhesive does not cure properly which results in no bond taking place in the center of the board in the direction of travel. This, accordingly, is a desirable feature although under some conditions will not be utilized.

FIGS. 12 and 13 include the same construction as FIGS. 10 and 11 but additionally provide for separate dampers for each half of the exhaust tube 52. As seen in FIG. 12, a damper 126 is mounted in each half of the exhaust tube on rods 128, the outer ends of which extend beyond the exhaust tubes and carry on this end a spring arm 130 with an inwardly bent tip 132 which is in frictional engagement with the casing forming the exhaust tube to maintain the damper in any desired selected position.

A further embodiment is shown in FIG. 14 wherein instead of a single nozzle extending across the width of the gap between the air chests two separate sets of nozzles are used. In this arrangement, a separate primary blower for each half is used. These blowers 134 and 136 respectively supply header ducts 138 and 140 which in turn open into exhaust tubes 144 and 146 and respectively feed nozzles associated therewith of a construction similar to those hereinbefore described Hand actuated dampers 150 and 152 are mounted in exhaust tubes 144 and 146 and are similar to those previously described Additionally, each blower is provided with dampers generally designated 152 and 154 in the intakes 156 and 158 of the blowers The provision of the two sets of nozzles and associated structure in between each set of chests permit air lifts to be supplied to each half of the board from between each set of steam chests and permits control of each half of the heating section selectively FIG. 15 shows a further embodiment wherein each half of a unit similar to that described in connection with FIG. 14 includes separate blowers 160, 162, etc. for each separate nozzle between each set of steam chests and each blower is provided with a separate damper 164, 166 to control individually to each nozzle the flow of air in an apparent manner.

The embodiment of FIG. 16 discloses an arrangement similar to that shown in FIG. 15 but includes additional hand operated dampers generally designated 168 and 170 in each exhaust tube 172 and 174 for each separate nozzle. This gives additional control for each individual air lift nozzle so that any combination thereof, nozzles can be placed in operation and the volume of air passing therethrough positively and accurately controlled. The dampers shown in this embodiment are the same as those shown and described in connection with FIGS. 12 and 13.

Figure 18:
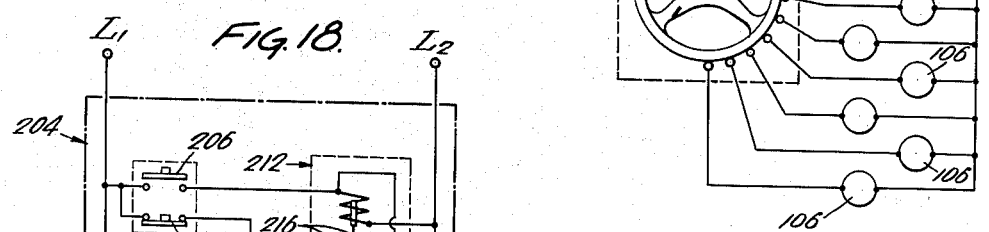
FIG. 18 is a composite view with a portion showing a single control unit for a single air exhaust tube station.

The major portion of the foregoing description has related to hand control operation of the various air nozzles. FIGURES 17 and 18 respectively disclose electrical control means, FIGURE 17 showing a circuit whereby the individual air nozzles will be regulated dependent upon setting of the double facer drive motor speed and FIGURE 18 a circuit for hand push button control by remote central control of the dampers etc. through solenoid controlled fluid cylinders or electric solenoids.

In FIG. 17, the double facer drive motor 176 is connected at one side to line L1 and the other side is connected to line L2 in which is interposed a rotary rheostat 178. A multiple contact rotary switch 180 is connected at one side through line 182 to line L2 and the contacts 184 thereof are connected to one side of coils 106 of solenoids as hereinbefore described for electrical or fluid control of the individual dampers. The other terminal or side of the coils 106 are connected through lead 186 to line L1. A master selsyn motor 188 is connected by leads 190 to lines L1 and L2 and is remotely positioned from the double facer machine. The master selsyn motor 188 is mechanically interconnected by member 192 to a rotary speed controller 194. The master selsyn motor 188 is connected by leads 196 to the terminals of a slave selsyn motor 198. Both these selsyn motors are of a fixed position type and interconnected in step one with another. A mechanical connection 200 interconnects selsyn motor 198 with rheostat 178 and a mechanical connection 202 connects the selsyn slave 198 to rotary switch 180. The arrangement is such that upon setting of speed controller 194 to a desired position to govern the speed of motor 176, the setting will be reflected in master selsyn 188 which in turn will set the slave selsyn motor 198 to the same setting which in operation will serve to set rotary switch 180 to a corresponding position to therefore energize or de-energize various of the coils of solenoids 106 which in turn will open or close the baffles to which they are operatively associated or connected. The speed of the motor 176 of course is controlled by actuation of the rheostat following a setting of the speed controller through the mechanical connection 200. It will also be apparent that any fluctuation in the motor speed resulting for example from line fluctuations, will serve through this arrangement to open or close a number of the baffles dependent upon the new motor speed or on the contrary, will serve to speed up the motor to the desired set speed on the speed controller.

It will also be apparent that the rotary switch could be interconnected with individual motors which drive individual blowers and in this way any predetermined number of air lift nozzles can be put into use for any predetermined drop in speed of the board through the double facer and with these arrangements and controls, a very flexible and positive means of controlling the temperature of the double faced corrugated paperboard at operating speed is provided as also at speeds slower than operating speed and at a complete stop.

Referring now to FIG. 18, this is a composite view of push button operation from a remote central control. The panel 204 has on the face thereof a row of on push buttons 206, a row of off push buttons 208 and a row of pilot lights, the number in each row corresponding to the number of individual controls incorporated in the double facer machine drying section. The electrical interconnection is shown in the upper portion of this figure which is an expanded view of a single member control. The start and stop buttons 206 and 208 are connected to line L1 and thence to relay 212. This includes a switch contact 214 leading to coil 106 of a solenoid for operating either a motor or a baffle as described above. Also interconnected in the circuit is the pilot light in parallel with the coil to indicate the condition of the solenoid. A second set of contacts 216 is provided and serves as a hold-in for the solenoid in a known manner. By proper manipulation of either the off or on push buttons various individual conrols of any blower and/or baffle, in the entire arrangement, can be effected.

Figure 19:
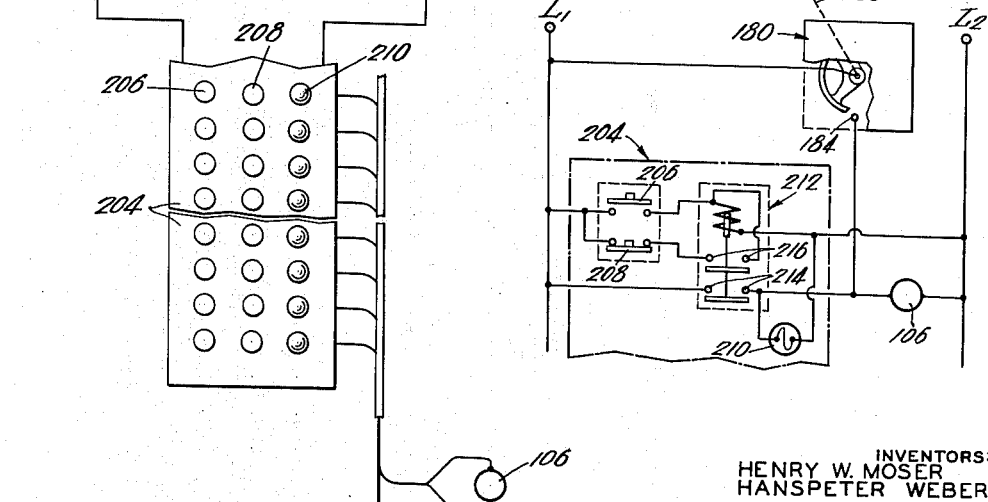
FIG. 19 is a schematic view of a circuit whereby the circuit of FIG. 17 has manual override control means.

For some installations it may be desirable to have a combination of automatic and manual control of blowers and/or baffles or an override arrangement on the automatic system. FIG. 19 fragmentarily shows such a combined circuit. This view incorporates the same reference numerals as in FIGS. 17 and 18. Only a single manual control is shown and only a single control solenoid since the remainder of the circuit would be only a duplication. If it is desired to manually activate any solenoid then the appropriate on or off push buttons 206, 208 are manipulated with resultant individual control of any selected blower and/or baffle.

With these various arrangements and controls as described, any combination can be arrived at and the air lift can be applied automatically or by hand in all areas or in any selected area down to a one-half width nozzle. This ability to provide air lift in selectable areas, not only will reduce or eliminate the "ski" or "canoe" type warpage but also the "S" type warpage which is a type having the appearance of an aircraft propeller.

It is also contemplated, if desired, to measure automatically the temperature of the heating surfaces, compare or correlate this with the speed, condition or type of board and automatically adjust the blowers and/or baffles accordingly. Devices and means for so doing will be apparent to those skilled in the art and accordingly are not shown or described in detail herein.

It will be apparent that the basic feature of the present invention is to utilize injecting a variable and controllable air or gas film between the board and the steam chests with an extreme flexibility of control and application in selected areas to very effectively control and regulate heat transferred to the travelling board and to prevent or eliminate various types of warpage. Additionally, it is to be realized that the initial cost of the mechanism to accomplish these objects is substantially less than in known existing machines. The controls are simpler, cheaper and more conventional and yet the results are better as the control is more sensitive. The arrangement permits greater flexibility, such as ability to select areas of a greater number of sizes without complicated or expensive equipment and controls. This again results in more flexibility in controlling various types of board warpage during the drying and curing of the board.

Manifestly, minor modifications can be effected in the present invention without departing from the spirit and scope thereof as defined in and limited solely by the appended claims.

We claim:

1. The process of curing and drying corrugated paperboard containing absorbed moisture comprising the steps of advancing the corrugated board lineally and in normal sliding contact relative to a series of platens having horizontally disposed upper heating surfaces residing parallel with the plane of travel of the corrugated board and in contiguous relationship therewith, maintaining said platens at a substantially constant temperature during advancement of the corrugated board, and regulating and controlling the degree of heat acting upon the advancing board by selectively injecting low pressure air in high volumes to form a variable and controllable air film having heat insulating properties between at least some of the heating surfaces and the lower surface of the corrugated board in selected areas thereof to thereby lift the corrugated board into spaced relation from the upper heating surfaces an amount to reduce the heat conductively transferred directly to the board from the heated surface and creating an air gap therebetween and an air insulation barrier of fresh moving air.

2. The process as claimed in claim 1, wherein the air film is so injected as to maintain the temperature of the paperboard approximately constant regardless of the speed of the double facer machine or even when stopped.

3. The process as claimed in claim 1, wherein the air film is injected into areas less than the full width of the paperboard.

4. Apparatus for curing and drying corrugated paperboard in a heating section of a double facer machine comprising a lineally arranged series of contiguous horizontally disposed platens having upper heating surfaces residing parallel with a plane of travel of said corrugated paperboard, heating means for said platens adapted to maintain said heating surfaces at a substantially constant temperature, means to selectively inject low pressure air in high volumes between contiguous selected ones of said platens below said corrugated board to create a variable and controllable air film between said heated surfaces and said corrugated board to thereby selectively lift said corrugated board away from conductive heat transfer contact with said heated surfaces and establish an air insulation barrier of fresh moving air therebetween for regulating and controlling drying and curing of said corrugated board and condition of the final end product so treated.

5. Apparatus as claimed in claim 4, said air injecting means including a blower, a header duct extending from said blower along the length of the double facer machine, take-off air tubes connected to said duct, and air nozzles operatively connected to said tubes, extending between contiguous ones of said platens and operable to inject air therebetween to create said air film.

6. Apparatus as claimed in claim 5, and means selectively operable to regulate and control the flow of air from any said nozzle.

7. Apparatus as claimed in claim 5, the cross-sectional area of said header duct being reduced following each said take-off tube whereby air pressure at all exhaust nozzles will be approximately equal.

8. Apparatus as claimed in claim 7, each said take-off tube having the same cross-sectional area and the total of all said areas being approximately equal to the area of the header duct connected to the blower.

9. Apparatus as claimed in claim 4, and including means operable upon a change in speed of the double facer to selectively control and regulate injection of air between any of said platens.

References Cited by the Examiner

UNITED STATES PATENTS

| | | | |
|---|---|---|---|
| 1,766,595 | 6/1930 | Buck | 34—18 |
| 1,924,100 | 8/1933 | Barker | 34—152 |
| 2,236,056 | 3/1941 | Grimm | 34—160 |
| 2,894,334 | 7/1959 | Thygeson | 34—160 |
| 2,896,335 | 7/1959 | Dungler | 34—156 |
| 2,929,153 | 3/1960 | Fry | 34—114 |
| 2,941,573 | 6/1960 | Cassady | 34—41 |
| 3,061,940 | 11/1962 | Cichelli | 34—156 |
| 3,175,300 | 3/1965 | Nitchie | 34—41 X |

WILLIAM F. O'DEA, *Primary Examiner.*

NORMAN YUDKOFF, *Examiner.*

F. E. DRUMMOND, J. J. CAMBY, *Assistant Examiners.*